Dec. 23, 1952 R. M. BERGSTEIN Re. 23,597

PARTITIONED CARTON

Original Filed Aug. 12, 1947 3 Sheets-Sheet 1

INVENTOR.
ROBERT M. BERGSTEIN.
Allen & Allen
ATTORNEYS.

Dec. 23, 1952 R. M. BERGSTEIN Re. 23,597

PARTITIONED CARTON

Original Filed Aug. 12, 1947 3 Sheets-Sheet 2

INVENTOR.

ROBERT M. BERGSTEIN.

Allen & Allen

ATTORNEYS.

Dec. 23, 1952 R. M. BERGSTEIN Re. 23,597

PARTITIONED CARTON

Original Filed Aug. 12, 1947 3 Sheets-Sheet 3

INVENTOR.
ROBERT M. BERGSTEIN.
BY
Allen & Allen
ATTORNEYS

Reissued Dec. 23, 1952

Re. 23,597

UNITED STATES PATENT OFFICE 23,597

PARTITIONED CARTON

Robert M. Bergstein, Wyoming, Ohio

Original No. 2,545,803, dated March 20, 1951, Serial No. 768,131, August 12, 1947. Application for reissue March 18, 1952, Serial No. 277,308

21 Claims. (Cl. 229—28)

Matter enclosed in heavy brackets [ ] appears in the original patent but forms no part of this reissue specification; matter printed in italics indicates the additions made by reissue.

The principal object of this invention is the provision of knock-down or folding cartons which, when erected, automatically form a box provided with a plurality of partition elements which are raised automatically as an incident to the setting up of the cartons. It is my object to provide such structures economically.

It is also an object of the invention to provide partitioned cartons adapted for the shipment, storage, protection, merchandising and display of products or articles of commerce. In this connection it is also my object to provide cartons in which the articles are adequately displayed but at the same time protected by transparent means, and in one form of my invention it is my object to provide an automatic, partitioned carton which also incorporates transparent protective means for the display.

These and other objects of the invention which will be set forth hereinafter or will be apparent to one skilled in the art upon reading these specifications, I accomplish in those structures and by those procedures of which I shall now describe certain exemplary embodiments. Reference is made to the accompanying drawings, wherein.

Figure 1:
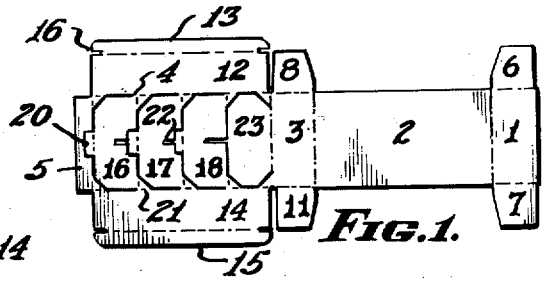
Figure 1 is a plan view of a blank for an exemplary form of my partitioned carton.

In the views of various paperboard blanks herein, dot-dash lines indicate lines of scoring and solid lines within the general contour of the blank indicate lines of cut. Referring first to Figure 1, I have shown a carton having in articulation, in the order named, body walls 1, 2, 3 and 4 and a glue flap 5. The body wall 1 is provided with flaps 6 and 7, while the body wall 3 is provided with flaps 8 and 11, as shown. The body wall 4 is provided at its upper edge with a closure flap 12 and a tuck flap 13, and at its lower edge with a closure flap 14 and a tuck flap 15. For locking purposes, notches indicated at 16 may be formed in alignment with the scores dividing the tuck flaps from the closure flaps respectively.

As thus far described, the carbon is in the form of the known tubular, tuck end carton style, being unusual only in that the greatest length of the structure is in the direction of the width of body walls 2 and 4.

For convenience hereinafter I shall refer to body walls 1 and 3 as end walls, wall 2 as a bottom wall, wall 4 as a top wall and walls 12 and 14 respectively as side walls. This is a matter merely of convenient nomenclature for the purpose of description herein, and is employed because my box will normally be used for merchandising and display purposes in a position in which it rests upon wall 2, with the wall 4 uppermost.

In the further formation of my carton, the blank shown in Figure 1 will be tubed, as hereinafter described, by folding it along a pair of intermediate score lines with the adhesive attachment of the glue flap 5 to the free edge of the body wall 1.

In the top wall 4, I form partition elements indicated at 16, 17 and 18. These are formed by cut lines. Each has a body portion of a depth equivalent to the width of the body walls 1 and 3, and an articulated attachment flap as indicated at 20. It will be noted that the attachment flap for the partition element 16 is formed from the glue flap 5, for which reason this glue flap is made wider than usual.

It will be noted also that the cut lines bounding the partition elements leave small triangular portions as at 21 which serve as means for articulating the partition elements to the top wall 4. As a matter of fact when the partition elements are erected, the small triangular members 21 constitute, in the form illustrated, all that is left of the top wall 4. The partition elements also may be provided with notches as indicated at 22, in the event a longitudinal division is required.

The length of the body wall 4 is made to be a multiple of the partition element. This leaves an element 23, which is not a partition element, and which is cut out entirely except for its line of articulation to the body wall 3.

My partition elements are of a general form hitherto known in the art for partition cartons, but they are employed in a new way. It will be noted that they are formed transversely of the width of the top wall 4, and in line with the axis of the tubular portion of the carton. Thus they are enabled to act in a new way, both during the tubing of the carton, and during the subsequent erection thereof.

Figure 2:
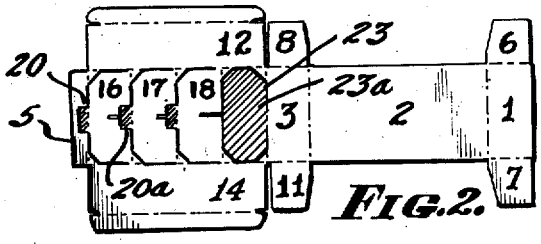
Figure 2 is a similar view with shaded areas showing the initial application of adhesive.
Figure 3:
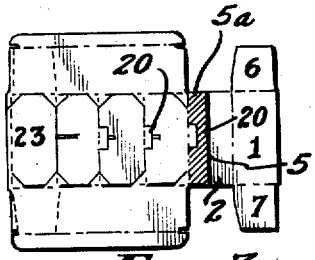
Figure 3 is a plan view showing a first stage in the tubing of the carton.
Figure 4:
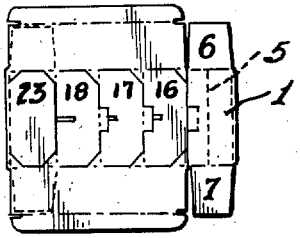
Figure 4 is a plan view showing the completely tubed structure in the form in which it may be shipped to the user.

Figure 2 may be considered a plan view of the same blank observed from the reverse or inside surface of the board. Shaded areas indicate adhesive. It will be noted that the entire member 23 is covered with adhesive as at 23a, and that the surfaces of the various articulated partition tabs 20 are covered with adhesive as at 20a. The application of this adhesive may be accomplished by a spot gluing mechanism attached to a timed section of a carton folding and gluing machine in which the blanks of Figures 1 and 2 travel in the direction of the axis of the tube to be formed from the blank. The remainder of the mechanism of the carton folding and gluing machine operates in the usual fashion. The next operation will be accomplished by folding the blank on the score line demarking body wall 3 from body wall 4, as shown in Figure 3. Adhesive will be applied to the glue flap 5 as at 5a. The result of the folding operation illustrated in Figure 3 will be to cause the member 23 to be folded over and adhered bodily to body wall 3, and to cause the various partition tabs 20 to be adhered to body wall 2. The final operation in tubing, as illustrated in Figure 4, will be the folding over of the body wall 1 on its line of articulation to body wall 2. This results in the adhesion of the glue flap 5 to the body wall 1 as will be understood. The result is a knock down carton in flat tubular form as shown in Figure 4; and the structure may be shipped in this form to the carton user.

Figure 5:
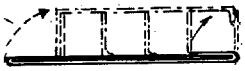
Figure 5 is a diagrammatic end view showing the mode of operation of the partition elements during the erection or setting up of the body of the carton.

The carton user will erect the tubular body in the usual way; but as illustrated in Figure 5, this also results in the erection of the partition members 16, 17 and 18, which now assume a vertical position parallel to body walls 1 and 3.

The member 23 lies inside of, and is adhesively secured to body wall 3, resulting in a substantial reinforcement of this body wall. Likewise the upper edge of body wall 1 will be reinforced by the glue flap 5.

Figure 8:
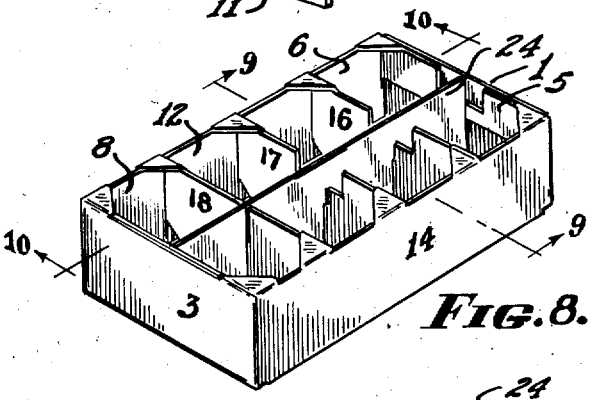
Figure 8 is a perspective view of the completely erected and partitioned carton with its ends closed.
Figure 7:
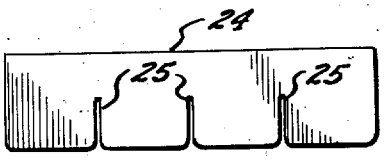
Figure 7 is a plan view of a longitudinal partition element which I may employ.

If it is desired to provide a transverse partition element dividing each cell into two pockets or divisions, I make use of an element indicated at 24 in Figure 7. This is a die-cut piece of paperboard or boxboard of elongated rectangular form, and provided with a series of notches 25 extending part way through its width, and spaced as are the partition elements themselves in the erected carton. As shown in Figure 8, this element may be disposed centrally of the box with the partition elements 16, 17 and 18 engaged in the notches 25, the unsevered portion of the partition element 24 being engaged in the notches 22 in the partition elements. In the particular form of box shown, this provides a structure having eight individual cells; but it will be understood that the structure of the box may be varied to provide more or fewer as may be desired.

Figure 9:
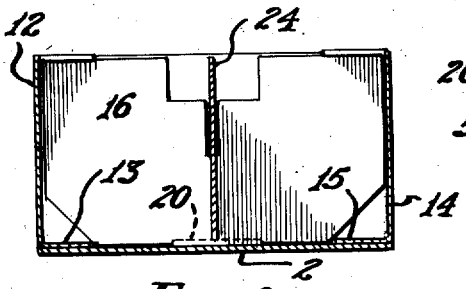
Figure 9 is a sectional view taken along the line 9—9 of Figure 8.
Figure 6:
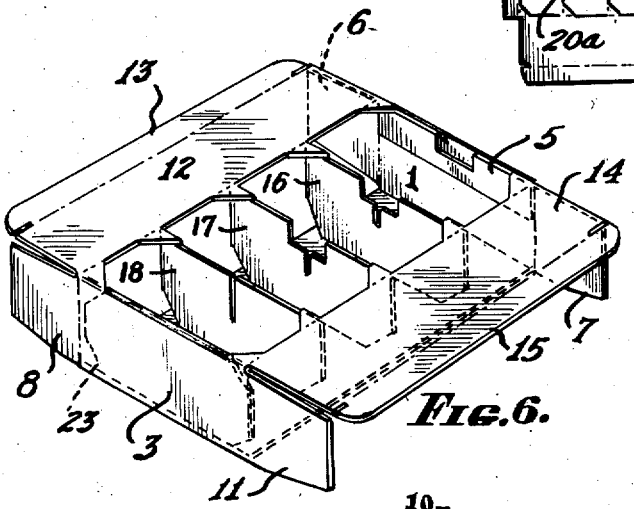
Figure 6 is a perspective view showing the carton erected but not closed on its ends.
Figure 10:
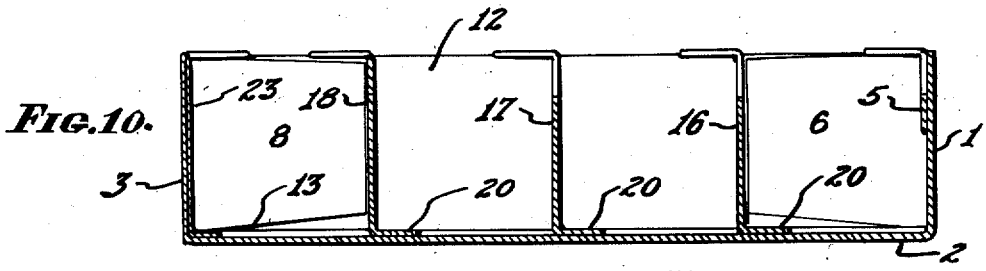
Figure 10 is a longitudinal sectional view taken along the line 10—10 of Figure 8.

Figure 6 shows the erected but unclosed carton. It may be filled through either or both ends, depending upon the use of the central partition element 24. It will then be closed as is usual with any tuck end carton. It may be noted that the diagonal bevels on the lower ends of the partition elements 16, 17 and 18 provides space for the tuck flaps 13 and 15 in the finished structure. This structure is illustrated in Figure 8. The relationship of the parts will be clear from the sectional views, Figures 9 and 10.

My carton is adapted for use with any type of articles requiring a partitioned structure; but is especially advantageous for the packaging of produce such as apples, tomatoes and the like where the display features of the structure are of assistance in merchandising, and where the carton itself serves to protect the articles from deterioration due to handling, fingering and pinching. The articles are, of course, readily visible through the upper wall 4 as will be evident. They may be protected in various ways. The carton may be given an all over wrap in cellophane or any of the other transparent non-fibrous films of commerce. The entire structure of Figure 8 may likewise be protected by the temporary or permanent use of the top structure of a two-piece box, which top structure is made of or comprises cellulose acetate, polystyrene or other transparent sheeting. Such top elements may be those of my copending application, Serial No. 720,407, filed January 6, 1947, and entitled Folding Boxes Employing Non-Scorable Sheeting or the tray-shaped structures of the copending application of Frank D. Bergstein, Serial No. 720,351, filed January 6, 1947, and entitled Transparent, Tray-Like Structures [.], *now Patent No. 2,593,834, dated April 22, 1952.*

Figure 11:
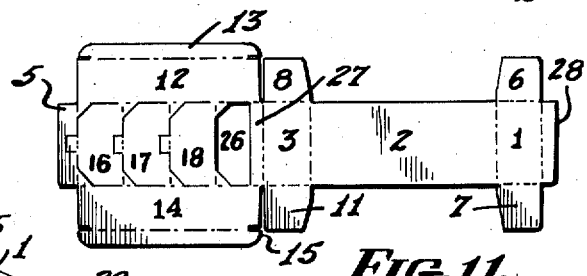
Figure 11 is a plan view of a modified form of blank for a partitioned carton.

It is also within the purview of my invention to provide a knock down paperboard carton of automatically partitioned character, which has transparent protective means built in as a part of the knock down structure. In Figure 11 I have shown a blank for a partitioned carton generally similar to that illustrated in Figures 1 and 2 hereof; and like parts have been given like index numerals. The essential difference in this style is the adoption of means which will provide marginal portions at the side edges of the top wall 4 for the adhesion of transparent protective means. The partition elements 16, 17 and 18 are formed as described above. The end element 23, however, is eliminated, and instead a portion 26 is died out from the blank and discarded as scrap, leaving a narrow marginal portion 27 at the side edge of top wall 4. Also a narrow member 28 may be articulated to the free edge of body wall 1.

Figure 12:
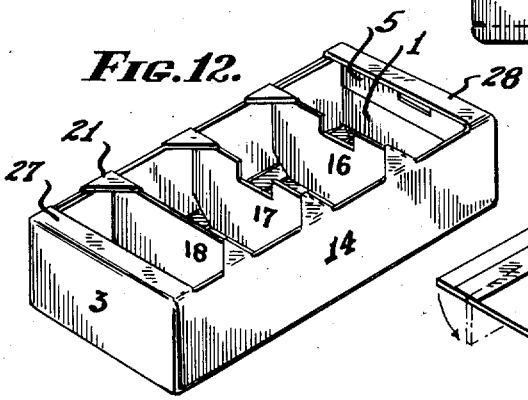
Figure 12 is a perspective view of a carton formed from the blank of Figure 11 in set up and closed condition.

The tubing of the blank and the spot gluing which results in the adhesion of the parition tabs 20 to the body wall 2 will be carried on as described above. A carton erected from the tubed structure will appear as indicated in Figure 12, and will essentially differ from that shown in Figure 8, in the provision of the narrow side portions 27 and 28 which, in addition to the triangular portions 21, constitute the top wall 4 in the erected structure. In tubing, the end portions of the narrow member 28 are adhered to the adjacent triangular portions 21 or the top wall 4, as will be readily understood.

Figure 13:
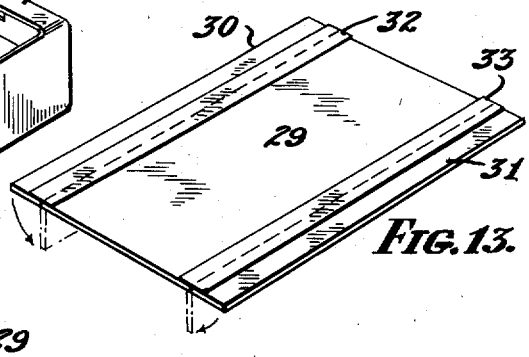
Figure 13 is a perspective view of an assembly of articulated panels of non-scorable sheeting.
Figure 14:
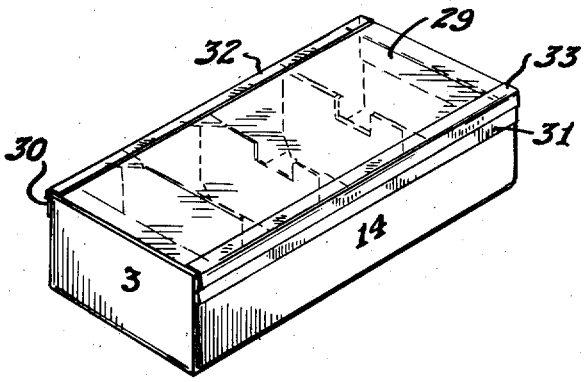
Figure 14 is a perspective view of the erected box of Figure 12 with transparent protective means.

In Figure 13 I have illustrated a structure comprising articulated panels of non-scorable sheeting. By non-scorable sheeting I mean any of those sheetings formed of transparent thermoplastic substances of commerce, such for example as cellulose acetate of polystyrene, which by reason of their thickness, cannot be scored for the formation of hinge lines as can boxboard. As taught in my copending application Serial No. 695,143, filed September 6, 1946, and entitled Knocked Down or Folding Structures Made From Acetate Sheeting or the Like, *now Patent No. 2,551,090, dated May 1, 1951,* I form from such non-scorable sheeting articulated panel structures by the process of slitting a continuous supply of the sheeting into strips of the desired width for the articulated panels, and then covering the lines of slit in the supply with strips of material thin enough and flexible enough to serve as hinging strips. These strips are adhesively secured to the edges of the strips of sheeting and extend across the slit lines therein. While this may be accomplished in various ways, I have found it preferable to employ for the hinging strips cellophane or similar material covered with a pressure sensitive adhesive. Such hinging strips may simply be pressed into position against the slit strips of sheeting. The treated supply of material is then cut transversely into pieces of the desired panel length. In making such structures, it is well to separate the slit edges of the panels during the taping operation sufficiently so that the articulated assembly will bend freely in either direction along its lines of articulation.

In Figure 13 I have illustrated an articulated assembly of panels of non-scorable sheeting. This has a central panel 29 made to be the same size and shape as the top wall 4 of the box. It has side panels 30 and 31, which may be made narrow, and the several panels are hinged together by means of hinging strips 32 and 33.

Figure 15:
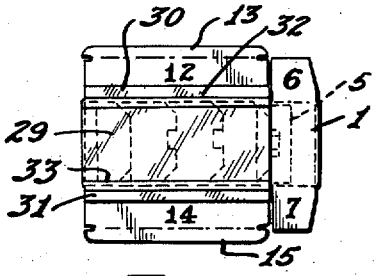
Figure 15 is a perspective view of the tubed structure of Figure 11 with the addition of the transparent protective means, the structure being in a form in which it may be sent to the user.
Figure 16:
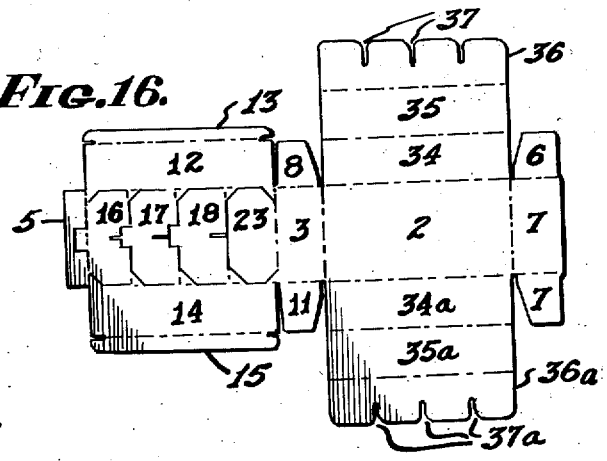
Figure 16 is a plan view of the blank of yet another form of my carton.

The articulated panel structure of Figure 13 may be associated with the tubed blank as is shown in Figure 15. The panel 29 will overlie the top wall 4 of the box and will be adhesively secured to the narrow marginal portions 27 and 28 by any suitable adhesive capable of adhering the non-scorable sheeting to the boxboard. The lines of articulation in the articulated panel structure will coincide with the score lines at the ends of top wall 4. Hence, the panel elements 30 and 31 will overlie and be adhesively secured to the walls 12 and 14.

The association of the articulated panel structure with the previously tubed blank is advantageous for two reasons. In the first place, the blank will of course be tubed with the outside surface or face side of the board outermost; and in my present structure the articulated panel assembly will be attached to the face side of the board. In the second place, the articulated panel assembly of Figure 13 may be located on the blank by causing its cut end to coincide with a folded edge portion of the blank, as will be clear from Figure 15. Otherwise, the articulated panel assembly may be located upon and adhesively joined to the paperboard structure in any of the ways set forth in my copending application Serial No. 744,417, filed April 28, 1947, and entitled Cartons With a Plurality of Stiff, Transparent Walls. It is also possible, within the purview of the present invention, to attach the articulated panel assembly to the paperboard blank prior to tubing; but this is more difficult, and requires a reversal of the blank prior to the attachment of the articulated panel assembly, and then another reversal of the blank preparatory to a tubing operation carried on, as described above, with the known carton folding and gluing machines.

In any of these ways, however, I provide a knock down, automatically partitioned carton, with built-in, transparent protective elements formed from an articulated assembly of sheeting panels. No assembly operation is required on the part of the box user, other than the common erecting, filling and closing operations, as will be understood.

Yet another style of partitioned carton is illustrated in Figures 16 to 19 hereof. The first of these figures illustrates a blank in which like parts have been given the same index numerals as in Figure 1. The partition elements 16, 17 and 18, and the reinforcement element 23 for the body wall 3 are formed in the same way. The essential difference between this blank and that of Figure 1 lies in the provision of extra tuck elements on the end margins on the body wall 2. Each of these elements comprises an element 34 or 34a dimensioned to overlie walls 12 or 14, as the case may be, a second element 35 or 35a, each dimensioned to extend half way across the top wall 4, and tuck elements 36 or 36a. These latter elements are notched as at 37 or 37a, the notches being spaced as are the erected partitions in the box.

Figure 17:
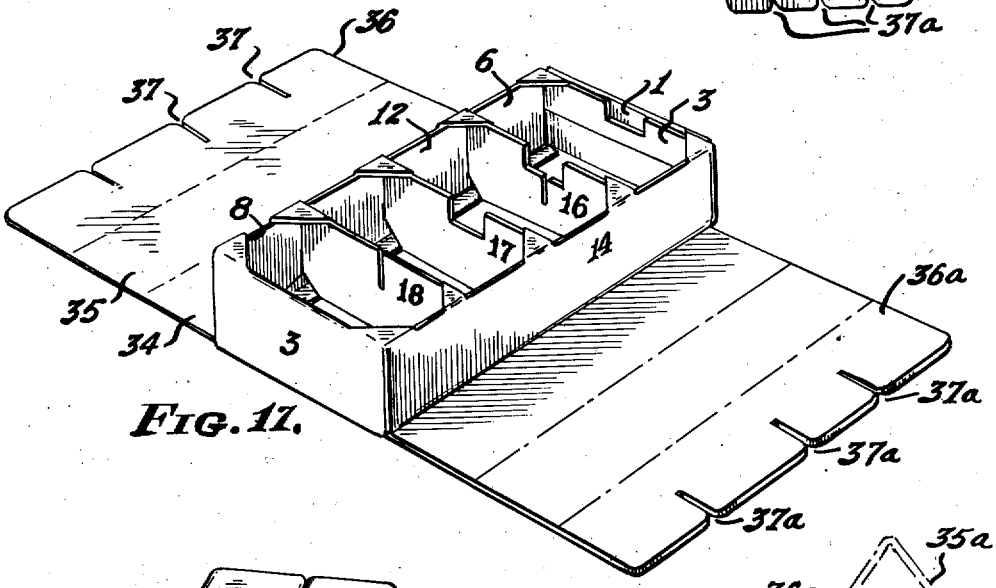
Figure 17 is a perspective view of the carton formed from the blank of Figure 16 in erected condition, as to the body, and in partially closed form.
Figure 18:
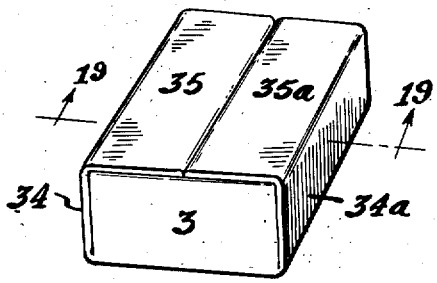
Figure 18 is a perspective view of the completely closed carton.
Figure 19:
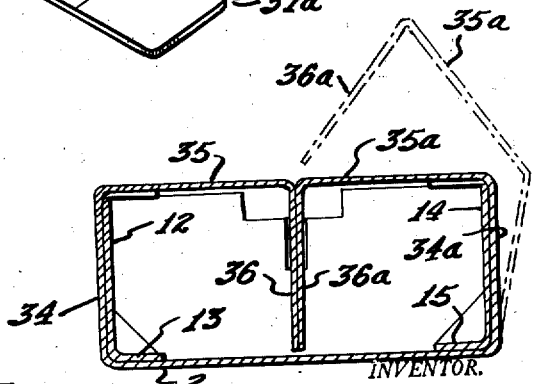
Figure 19 is a sectional view thereof taken along the line 19—19 of Figure 18.

When the box is erected as in Figure 17, its ends may be closed, as shown, by means of the tuck assemblies 12, 13, 14 and 15; and this may be done either before or after filling, as is found most convenient. Then the additional flap elements are folded upwardly so that portions 34 and 34a overlie and reinforce the walls 12 and 14, portions 35 and 35a extend toward each other and meet across the top of top wall 4 and tuck elements 36 and 36a extend downwardly centrally of the box to form a central partition. The disposition of these parts in the closed structure is made clear in the sectional view, Figure 19. The box of Figures 16 to 19 inclusive is an exceptionally strong box well adapted to protect fragile contents. If a display feature is desired, elements 35 and 35a may be provided with windows as is common in the carton art, and these windows may if desired be covered with any of the transparent, non-fibrous films of commerce.

While I have illustrated partition elements of a certain size and shape, and while it is essential in the practice of my invention that the depth of the partition elements between their points of articulation to the top wall 4 and the lines of their articulation to the tabs 20 be equivalent to the depth of the adjacent body walls in the erected package, the size and shape of the partition elements may be varied as desired. They may be given particular shapes appropriate to the nature of the contents of the box. Similarly the cut lines demarking the side edges of the partition elements need not be coincident with the score line articulating the top wall 4 to wall elements 12 and 14, but may be spaced inwardly therefrom leaving intact the marginal portions of the top wall 4. In the style of carton shown in blank form in Figure 16, cut-outs may be formed in elements 35 and 35a; and these cut-outs may be in any shape appropriate to the contents of the box. For example, if the box is to contain apples, these cut-outs may be made in the shape of apples. They may be provided with windows, as indicated above, or not as desired.

Modifications may be made in my invention without departing from the spirit of it. Having thus described my invention in certain exemplary embodiments, what I claim as new and desire to secure by Letters Patent is:

1. A partitioned carton comprising a boxboard blank adapted to be tubed, and having a plurality of body walls in articulation and a glue flap at one end, end closure elements articulated to one at least of said body walls, one of said body walls constituting a top wall having partition elements formed therein, each of said partition elements having a point of articulation to the top wall, having a depth equivalent to the width of an adjacent body wall, and having an attachment flap at a point remote from its point of articulation to the top wall, said partition elements being formed in said top wall so as to extend in the direction of the axis of a tubular structure formed from said blank, *and spaced apart a distance substantially no greater than their depths, with the attachment flap of at least one of said partition elements formed in the body portion of the next adjacent partition element,* said blank being tubed so as to bring said attachment flaps against an opposite body wall in offset relationship, said attachment flaps being in said relationship to said opposite body wall in the tubed structure, so that when the tubed structure is erected, said partition elements will *be* automatically [be] erected.

2. The structure claimed in claim 1 in which the attachment flap for one of said partition elements is formed from said glue flap, said glue flap being wider than said attachment flap so as to maintain its integrity.

3. The structure claimed in claim 2, wherein said partition elements are formed in series beginning adjacent said glue flap, and wherein adjacent the opposite end of said top wall there is an element severed from said top wall, remaining in articulation with an adjacent body wall, and in the tubed structure folded against said adjacent body wall and adhesively secured thereto.

4. The structure claimed in claim 3 wherein said top wall has closure flaps articulated to it, and wherein said partition elements have portions of their end edges formed by lines of cut substantially coincident with the lines of articulation of said flaps to said top wall.

5. The structure claimed in claim 4 wherein said several partition elements have central notches formed therein, in combination with a transverse partition element which is a piece of boxboard notched at distances corresponding to the spacing of said partition elements in the erected structure.

6. The structure claimed in claim 4 wherein additional tuck elements are articulated to free edges of a body wall opposite said top wall, said additional tuck elements comprising in order pieces to overlie the first mentioned tuck elements, pieces acting to come together across said top wall at the median line thereof, and tuck pieces to extend downwardly from said median line, said last mentioned tuck pieces being notched with notches spaced as are the partition elements in the erected structure.

7. A partitioned carton comprising a boxboard blank adapted to be tubed, and having a plurality of body walls in articulation and a glue flap at one end, end closure elements articulated to one at least of said body walls, one of said body walls constituting a top wall, and partition elements formed therein, each of said partition elements having a point of articulation to the top wall, having a depth equivalent to the width of an adjacent body wall, and having an attachment flap at a point remote from its point of articulation to the top wall, said partition elements being formed in said top wall so as to extend in the direction of the axis of a tubular structure formed from said blank, said blank being tubed so as to bring said attachment flaps against an opposite body wall in offset relationship, said attachment flaps being attached in said relationship to said opposite body wall in the tubed structure, so that when the tubed structure is erected, said partition elements will automatically be erected, said partition elements being so formed from said top wall as to leave a narrow marginal portion of said top wall adjacent an adjoining body wall, and a transparent protective material covering said top wall and adhered to said narrow marginal portions.

8. The structure claimed in claim 7 wherein said transparent protective material is a panel of non-scorable sheeting.

9. The structure claimed in claim 7 wherein said transparent protective material comprises a panel of non-scorable sheeting, said panel being of a size and shape to cover said top wall, marginal portions of said panel being articulated to adjacent panels, said top wall having closure elements articulated to its free edges, and said last mentioned panels being adhesively secured to said closure elements.

10. In combination a paperboard blank of tubular form comprising a series of body walls in articulation and closure elements articulated to the ends of one of said body walls, said body wall having a cut-out therein, said cut-out spaced from a side edge of said body wall a distance sufficient to provide a marginal portion along the side edge of said body wall, and an articulated assembly of non-scorable sheeting joined to said tubular blank with the lines of articulation in said articulated assembly coincide with lines of articulation between said top wall and said closure elements.

11. The structure claimed in claim 10 wherein said articulated assembly of non-scorable sheeting panels is associated with the outside surface of said paperboard structure.

12. A carton comprising a tubular series of body walls in articulation, and closure elements articulated to free edges of one of said body walls, said body wall constituting a top wall, partition elements formed in said top wall, having points of articulation thereto, having depths equivalent to the width of an adjacent body wall, and attachment tabs on their opposite sides, said paperboard blank being tubed with said top wall in offset relationship with respect to an opposite body wall, to which said tabs are adhesively secured, and an articulated assembly of non-scorable sheeting panels joined to said paperboard structure, a central one of said panels being of a shape and size corresponding to said top wall and outlying ones of said panels being articulated to the first mentioned panel by means of hinging strips, said outlying panels overlying said closure means and adhesively secured thereto, and the lines of articulation of said articulated panel assembly coinciding with the lines of articulation of said closure elements to said top wall.

13. A carton comprising a series of body walls in articulation and forming a tubular body, one of said walls constituting a top wall for the carton and an opposite wall constituting a bottom wall, partition elements formed in said top wall having points of articulation thereto at the edges of said top wall, having depths equivalent to the width of an adjacent body wall, and having attachment tabs on their free sides, said paperboard blank being tubed so as to bring said attachment tabs in offset relationship against said bottom wall, said tabs being adhesively secured thereto, closure elements articulated to said top wall and having tuck flaps and at least one additional closure element articulated to said body wall and having a portion to overlie one of said first mentioned closure elements and a portion to overlie said top wall.

14. A carton comprising a series of body walls in articulation and forming a tubular body, one of said walls constituting a top wall for the carton and an opposite wall constituting a bottom wall, partition elements formed in said top wall having points of articulation thereto at the edges of said top wall, having depths equivalent to the width of an adjacent body wall, and having attachment tabs on their free sides, said paperboard blank being tubed so as to bring said attachment tabs in offset relationship against said bottom wall, said tabs being adhesively secured thereto, closure elements articulated to said top wall and having tuck flaps and additional closure elements articulated to said bottom wall, each of said closure elements having a portion to overlie one of said first mentioned closure elements and an additional portion to extend across said top wall substantially to the median line thereof, said last mentioned portion having a tuck flap, said tuck flap being notched to accept said partition elements, whereby said last mentioned tuck flaps together form a central transverse partition for said carton.

15. The structure claimed in claim 14 wherein said portions extending across said top wall are provided with cut-outs to display the contents of said carton.

16. A carton comprising a series of body walls in articulation and forming a tubular body, one of said walls constituting a top wall for the carton and an opposite wall constituting a bottom wall, a partition element formed in said top wall and having a point of articulation to said top wall, [and] having a depth equivalent to the distance between said top wall and said bottom wall, and having an attachment tab on its free side, *said attachment flap being formed in a second partition element adjacent said first mentioned partition element,* said partition elements being formed in said top wall so as to extend in the direction of the axis of said tubular body.

17. A partitioned carton comprising a boxboard blank adapted to be tubed, and having a pluarlity of body walls in articulation and a glue flap at one end, one of said body walls having a partition element *formed therein,* said partition element having a point of articulation to said body wall, having a depth equivalent to the distance between said body wall and an opposite body wall, and having an attachment flap at a point remote from its point of articulation to said body wall, *said attachment flap being formed in a second partition element adjacent said first mentioned partition element,* said *first mentioned* partition element extending in the direction of the axis of a tubular structure formed from said blank, said blank being tubed so as to bring said attachment flap against an opposite body wall in offset relationship, said attachment flap being attached in such relationship to said opposite body wall in the tubed structure, so that when the tubed structure is erected, said partition element will *be* automatically [be] erected.

*18. In a partitioned carton formed from a boxboard blank, four body walls connected together along parallel score lines to form a collapsible tube, a partition element formed in one of said body walls and having a depth substantially equal to the width of a body wall adjacent said first mentioned body wall, said partition element being articulated to said first mentioned body wall along a line of articulation extending parallel to the score line connecting said first mentioned body wall and said adjacent body wall and spaced from said last mentioned score line by a distance substantially no greater than the depth of said partition element, and an attachment flap on the edge of said partition element opposite its line of articulation to said first mentioned body wall, said attachment flap formed from a portion of the boxboard blank lying beyond said last mentioned score line, said attachment flap being secured to the body wall opposite said first mentioned body wall in such position that said partition element extends parallel to said adjacent body wall and is collapsible therewith.*

*19. In a partitioned carton formed from a boxboard blank, four body walls connected together along parallel score lines to form a collapsible tube, at least a pair of partition elements formed in one of said body walls each having a depth substantially equal to the width of a body wall adjacent said first mentioned body wall, said partition elements being articulated to said first mentioned body wall along lines of articulation extending parallel to the score line connecting said first mentioned body wall and said adjacent body wall, said partition elements being spaced apart a distance substantially no greater than the depth of said partition elements, and attachment flaps connected to the edges of said partition elements opposite their lines of articulation to said first mentioned body wall, at least one of said attachment flaps being formed from the body portion of the next adjacent partition element, said attachment flaps being secured to the body wall opposite said first mentioned body wall in such position that said partiton elements extend parallel to said adjacent body wall and and are collapsible therewith.*

*20. In a partitioned carton formed from a boxboard blank, four body walls connected together along parallel score lines to form a collapsible tube, at least a pair of partition elements formed in one of said body walls each having a depth substantially equal to the width of a body wall adjacent said first mentioned body wall, said partition elements being articulated to said first mentioned body wall along lines of articulation extending parallel to the score line connecting said first mentioned body wall and said adjacent body*

*wall, said partition elements being spaced from each other a distance substantially no greater than the depth of said partition elements with one of said partition elements additionally spaced from said last mentioned score line by a distance substantially no greater than the depth of said partition elements, and attachment flaps on the edges of said partition elements opposite their lines of articulation to said first mentioned body wall, one of said attachment flaps being formed from the body portion of the next adjacent partition element and another of said attachment flaps being formed from a portion of the boxboard blank lying beyond the score line connecting said first mentioned body wall and said adjacent body wall, said attachment flaps being secured to the body wall opposite said first mentioned body wall in such position that said partition elements extend parallel to said adjacent body wall and are collapsible therewith.*

*21. In a partitioned carton formed from a boxboard blank, four body walls and a glue flap connected together along parallel score lines to form a collapsible tube, a plurality of partition elements formed in the body wall adjacent said glue flap each having a depth substantially equal to the width of a body wall adjacent said first mentioned body wall, said partition elements being articulated to said first mentioned body wall along lines of articulation extending parallel to the score line connecting said first mentioned body wall and said glue flap, said partition elements spaced apart a distance substantially no*

*greater than the depth of said adjacent body wall with one of said partition elements spaced from said last mentioned score line by a distance substantially no greater than its depth, attachment flaps connected to the edges of said partition elements opposite their lines of articulation to said first mentioned body wall, one of said attachment flaps being formed from the body portion of the next adjacent partition element and another of said attachment flaps being formed from said glue flap, said attachment flaps being secured to the body wall opposite said first mentioned body wall in such position that said partition elements extend parallel to said adjacent body wall and are collapsible therewith.*

ROBERT M. BERGSTEIN.

REFERENCES CITED

The following references are of record in the file of this patent or the original patent:

UNITED STATES PATENTS

| Number | Name | Date |
|---|---|---|
| 1,049,910 | Peck | Jan. 7, 1913 |
| 1,195,358 | Hullings | Aug. 22, 1916 |
| 1,360,042 | Srofe | Nov. 23, 1920 |
| 1,394,134 | Aberle | Oct. 18, 1921 |
| 2,076,844 | Holmes | Apr. 13, 1937 |
| 2,205,332 | Aste | June 18, 1940 |
| 2,325,756 | Eggebrecht et al. | Aug. 3, 1943 |
| 2,326,648 | Horr | Aug. 10, 1943 |
| 2,373,851 | Potter | Apr. 17, 1945 |
| 2,527,702 | Buttery | Oct. 31, 1950 |